United States Patent [19]
Orlandi et al.

[11] Patent Number: 5,498,429
[45] Date of Patent: Mar. 12, 1996

[54] FRUIT JUICE CENTER-FILLED CHEWING GUM

[75] Inventors: Daniel A. Orlandi, Long Valley; Lucy L. Wong, Lake Hiawatha; Hector Olaya, Parsippany, all of N.J.; Kenneth P. Bilka, Floral Park, N.Y.

[73] Assignee: Warner-Lambert Company, Morris Plains, N.J.

[21] Appl. No.: 321,499

[22] Filed: Oct. 12, 1994

[51] Int. Cl.$^6$ ..................................... A23G 3/30
[52] U.S. Cl. ................................ 426/5; 426/599
[58] Field of Search ................... 426/3–6, 599

[56] References Cited

U.S. PATENT DOCUMENTS

| | | | |
|---|---|---|---|
| 810,210 | 1/1906 | Laws | 426/5 |
| 3,806,290 | 4/1974 | Graff et al. | 425/133 |
| 3,857,963 | 12/1974 | Graff et al. | 426/3 |
| 3,894,154 | 7/1975 | Graff et al. | 426/5 |
| 4,156,740 | 5/1979 | Glass et al. | 426/3 |
| 4,157,402 | 6/1979 | Ogawa et al. | 426/5 |
| 4,250,196 | 2/1981 | Friello | 426/5 |
| 4,252,829 | 2/1981 | Terrevazzi | 426/5 |
| 4,301,178 | 11/1981 | Witzel et al. | 426/5 |
| 4,316,915 | 2/1982 | Friello et al. | 426/5 |
| 4,466,983 | 8/1984 | Cifrese et al. | 426/5 |
| 4,513,012 | 4/1985 | Carroll et al. | 426/5 |
| 4,563,345 | 1/1986 | Arrick | 424/48 |
| 4,642,235 | 2/1987 | Reed et al. | 426/5 |
| 4,683,138 | 7/1987 | Glass et al. | 426/5 |
| 4,938,971 | 7/1990 | Chapdelaine et al. | 426/3 |
| 4,975,288 | 12/1990 | Hager et al. | 426/5 |
| 4,980,178 | 12/1990 | Cherukuri et al. | 426/5 |
| 5,116,626 | 5/1992 | Synosky et al. | 426/3 |
| 5,125,819 | 6/1992 | Hager et al. | 426/5 |

FOREIGN PATENT DOCUMENTS 2027177  4/1991  Canada.

*Primary Examiner*—Jeanette Hunter
*Attorney, Agent, or Firm*—Linda A. Vag

[57] ABSTRACT

A center-filled chewing gum having an outer chewing gum shell enclosing a cavity and a liquid center-fill. The liquid center-fill contains a fruit juice concentrate and an acid/buffer system.

17 Claims, No Drawings

FRUIT JUICE CENTER-FILLED CHEWING GUM

BACKGROUND OF THE INVENTION

1. Field of the Invention

The present invention relates to a center-filled chewing gum having a fruit juice concentrate in its cavity.

2. Description of the Prior Art

A center-filled chewing gum generally has an outer chewing gum shell enclosing a cavity and a liquid center-fill within the cavity.

Fruit juice containing products usually have great consumer appeal because of the connection between fruit juice and a healthy lifestyle. However, there is no fruit juice center-filled chewing gum in the marketplace today. Consumers cannot get the real fruit juice-like feel in regular stick gums utilizing fruit juice, and gums made with freeze-dried fruit juice are sticky to chew. A center-filled chewing gum containing a fruit juice concentrate in its cavity would typically be unstable because the fruit juice concentrate, due to its low pH, causes the sugar in the gum shell and in the liquid center-fill to undergo inversion. As a result, the gum shell collapses into the center-filled cavity. The center-filled chewing gum becomes organoleptically unacceptable with an unstable, short shelf life.

Because of the difficulties encountered in making a fruit juice center-filled chewing gum that has a stable shelf life and is organoleptically acceptable, all fruit juice containing chewing gum products up to the present time use the fruit juice as an additive or as a replacement for softeners in the chewing gum composition.

U.S. Pat. No. 4,938,971 discloses a fluid fruit juice concentrate-plasticizer composition for use as an additive to chewing gum. The fruit juice concentrate must be dehydrated to a very low moisture content in order to have a chewing gum with a stable shelf life.

Canadian Patent Application No. 2,027,177 discloses chewing gum compositions containing concentrated fruit juices as a flavoring agent and as a replacement for other additives such as softeners, plasticizers, and bulking agents.

U.S. Pat. No. 810,210 discloses a chewing gum piece having a cavity filled with a liquid or semi-liquid such as a fruit syrup.

SUMMARY OF THE INVENTION

The present invention provides a center-filled chewing gum comprising an outer chewing gum shell enclosing a cavity and a liquid center-fill within the cavity, wherein the liquid center-fill comprises a fruit juice concentrate and an acid/buffer system. The fruit juice center-filled chewing gum has a stable shelf life and gives a real fruit juice-like feel that is organoleptically acceptable to the consumer.

DETAILED DESCRIPTION OF THE INVENTION

The liquid center-fill in the fruit juice center-filled chewing gum according to the present invention comprises a fruit juice concentrate and an acid/buffer system.

While not wishing to be bound by any theory, the present inventors believe that the presence of the acid/buffer system in the liquid center-fill reduces the rate of inversion of sugar from the chewing gum shell and the liquid center, thereby making the fruit juice center-filled chewing gum stable with a long shelf life and organoleptically acceptable.

The acid/buffer system according to the present invention may be any food acceptable acid and its buffer. Examples of suitable acid/buffer systems include citric acid/sodium citrate, lactic acid/sodium lactate, tartaric acid/potassium hydrogen tartrate, malic acid/sodium lactate, acetic acid/sodium acetate, and fumaric acid/sodium fumarate. Preferably, citric acid/sodium citrate, lactic acid/sodium lactate, tartaric acid/potassium hydrogen tartrate, or malic acid/sodium lactate is employed as the acid/buffer system, and most preferably, citric acid/sodium citrate is employed as the acid/buffer system of the present invention.

The amount of the acid/buffer system present in the liquid center-fill should be sufficient to maintain a pH of about 2 to 4 for the liquid center-fill. Typically, the acid/buffer system is present in the liquid center-fill in an amount of from about 0.1% to about 3%, preferably from about 0.5% to about 2%, by weight based on the total weight of the liquid center-fill.

Fruit juice concentrates of any flavor can be used in the liquid center-fill of the present invention. Examples of suitable fruit juice concentrates include concentrates of the following juices: orange, apple, grape, pear, strawberry, blueberry, raspberry, banana, lemon, lime, grapefruit, cherry, pineapple, peach, apricot, tangerine, mango, papaya, and mixtures thereof. Preferably, the fruit juice concentrate used is selected from concentrates of orange juice, apple juice, grape juice, and pear juice. The amount of fruit juice concentrate can vary depending upon factors including the type of sweetener used and the level of real fruit juice-like feel desired. Typically, the fruit juice concentrate is present in the liquid center-fill in an amount of from about 5% to about 40%, preferably from about 10% to about 20%, by weight based on the total weight of the liquid center-fill.

The center-fill typically contains a sweetener. The sweetener may comprise saccharide sweeteners, sugar alcohols, or intense sweeteners, or mixtures thereof.

Examples of suitable saccharide sweeteners include monosaccharides, disaccharides, and polysaccharides such as xylose, ribose, glucose, mannose, galactose, fructose, levulose, dextrose, sucrose, maltose, partially hydrolyzed starch, corn syrup solids, and high fructose corn syrup. Examples of suitable sugar alcohols include sorbitol, xylitol, mannitol, maltitol, isomalt, and hydrogenated starch hydrolysate commercially available, for example, under the product designation LYCASIN® (Roquette Corporation).

Examples of suitable intense sweeteners include (A) water-soluble naturally-occurring intense sweeteners such as dihydrochalcones, monellin, steviosides, glycyrrhizin, dihydroflavenol, and L-aminodicarboxylic acid aminoalkenoic acid ester amides, such as those disclosed in U.S. Pat. No. 4,619,834, and mixtures thereof; (B) water-soluble artificial intense sweeteners including the soluble saccharin salts, such as sodium or calcium saccharin salts, cyclamate salts, the sodium, ammonium or calcium salts of 3,4-dihydro-6-methyl-1,2,3-oxathiazine- 4-one-2,2-dioxide, the potassium salt of 3,4-dihydro-6-methyl- 1,2,3-oxathiazine-4-one-2,2-dioxide (Acesulfame-K), the free acid form of saccharin, and the like, and mixtures thereof; (C) dipeptide based intense sweeteners including L-aspartic acid derived sweeteners, such as 1-aspartyl-L-phenylalanine methyl ester (Aspartame) and its related materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenyl-glycine and L-aspartyl-L-2,5-dihydrophenyl-glycine, L-aspartyl-2,5-dihydro-L-phenylalanine, L-aspartyl-L-(1-cyclohexene)-alanine, and the like, and mixtures thereof; (D) water-soluble intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of SUCRALOSE® (McNeil); examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl- 1-chloro-1-deoxy-beta-D-fructofuranoside, or 4,1'-dichloro-4,1'-dideoxygalactosucrose; 1',6'-dichloro-1',6'-dideoxysucrose; 4-chloro- 4-deoxy-alpha-D-galactopyranosyl- 1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl- 6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl- 1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxysucrose, and mixtures thereof; and (E) protein based intense sweeteners such as thaumaoccous danielli (Thaumatin I and II).

In general, the amount of sweetener employed will vary with the sweetener selected for a particular chewing gum. Thus, for any given sweetener a sufficient amount of sweetener is used to provide the level of sweetness desired. This amount will normally be from about 0.01% to about 93% by weight based on the total weight of the liquid center-fill when using an easily extractable sweetener. The saccharide sweeteners and sugar alcohols described above are usually employed in amounts of from about 17% to about 90% by weight and preferably in amounts of from about 50% to about 70% by weight based on the total weight of the liquid center-fill. The intense sweeteners described are usually used in an amount of up to about 1%, preferably from about 0.05% to about 0.3%, by weight based on the total weight of the liquid center-fill.

Other additives that may be added to the liquid center-fill include softeners and flavoring agents. Examples of suitable softeners include glycerin, propylene glycol, high fructose corn syrup, corn syrup, sorbitol solution, and hydrogenated starch hydrolysate commercially available, for example, under the product designation LYCASIN®. The glycerin suitable for use in the center-fill of the present invention is the United States Pharmacopeia (USP) Glycerin containing not less than about 95% glycerin and about 5% water. Typically, the liquid center-fill contains from about 12% to about 85% by weight of the softener based on the total weight of the center-fill. Examples of suitable flavoring agents include any natural, artificial, or synthetic fruit flavors such as vanilla; citrus oils including lemon, orange, lime, and grapefruit; fruit essences including apple, pear, peach, grape, strawberry, raspberry, cherry, plum, pineapple, and apricot; and mixtures thereof. The amount of flavoring agent employed is normally a matter of preference subject to factors such as flavor type and strength desired. In general, the center-fill typically may contain from about 0.5% to about 5% by weight of the flavoring agent based on the total weight of the liquid center-fill.

Other ingredients such as gums may also be added to the liquid center-fill according to the present invention. Suitable gums include natural gums, such as guar, carrageenan, and the like, synthetic gums, such as carboxymethyl cellulose hydropropyl cellulose, and the like, and mixtures thereof.

Water is generally added to the liquid center-fill to bring the composition of the liquid center-fill to 100 weight %. Preferably, the amount of water present in the liquid center-fill is from about 1% to about 5% by weight based on the total weight of the liquid center-fill.

The outer chewing gum shell according to the present invention may be made from any gum base composition well known in the art. Illustrative examples of suitable polymers as the gum base include both natural and synthetic water-insoluble elastomers and rubbers. Examples of suitable polymers include, without limitation, substances of vegetable origin such as chicle, jelutong, balata, guttapercha, lechi capsi, sorva, guayule rubber, crown gum, natural rubber, nispero, rosidinha, perillo, niger gutta, tunu, gutta kay, and the like, and mixtures thereof. Examples of synthetic elastomers include, without limitation, styrene-butadiene copolymers, polyisobutylene, isobutylene-isoprene copolymers, polyethylene, polyvinylacetate, and the like, and mixtures thereof.

The amounts of polymer employed in the gum base composition will vary considerably depending upon various factors such as the type of gum base used, the consistency of the gum base composition desired, and the other components used in the composition to make the final chewing gum product. In general, the polymer is present in the gum base composition in an amount of from about 5% to about 50%, preferably from about 15% to about 25%, by weight based on the total weight of the gum base composition.

The gum base composition typically contains a sweetener. The sweetener may be selected from the sweeteners described above with respect to the liquid center-fill. In general, like the amount of sweetener in the liquid center-fill, the amount of sweetener employed in the gum base composition will vary with the sweetener selected for a particular chewing gum. Thus, for any given sweetener a sufficient amount of sweetener is used to provide the level of sweetness desired. This amount will normally be from about 0.01% to about 93% by weight based on the total weight of the gum base composition when using an easily extractable sweetener. The saccharide sweeteners and sugar alcohols described above are usually used in an amount of from about 17% to about 92.5% and preferably in an amount of from about 55% to about 65%, by weight based on the total weight of the gum base composition. The intense sweeteners described above are usually used in an amount of up to about 1%, preferably from about 0.05% to about 0.4%, by weight based on the total weight of the gum base composition.

The gum base composition may also contain a variety of other traditional ingredients, including elastomer solvents, emulsifiers, plasticizers, softeners, fillers, coloring agents, flavoring agents, and mixtures thereof.

Elastomer solvents aid in softening any elastomer component of the gum base composition. Suitable elastomer solvents may comprise those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base composition in an amount of from about 2% to about 15%, and preferably from about 7% to about 11%, by weight of the gum base composition.

Emulsifiers aid in dispersing the immiscible components of the gum base composition into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in an amount of from about 2% to about 15%, and preferably from about 7% to about 11%, by weight of the gum base composition.

Plasticizers or softeners provide a variety of desirable textures and consistency properties to the gum base composition. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerin, high fructose corn syrup, corn syrup, sorbitol solution, hydrogenated starch hydrolysate, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, and the like, and mixtures thereof may also be incorporated into the gum base composition. The plasticizers and softeners are generally employed in the gum base composition in an amount of up to about 25%, and preferably in an amount of from about 1% to about 17%, by weight of the gum base composition.

Preferred softeners are the hydrogenated vegetable oils and include soybean oil and cottonseed oil which may be employed alone or in combination. These softeners provide the gum base composition with good texture and soft chew characteristics. These softeners are generally employed in an amount from about 5% to about 14%, and preferably in an amount from about 5% to about 13.5%, by weight of the gum base composition.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base composition of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be from about 5% to about 40%, and preferably from about 5% to about 20%, by weight of the gum base composition.

A variety of other traditional ingredients may be optionally included in the gum base composition in effective amounts such as coloring agents, antioxidants, preservatives, flavoring agents, and the like. For example, titanium dioxide and other dyes suitable for food, drug and cosmetic applications, known as F.D.& C. dyes, may be utilized. An antioxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base composition of the present invention.

The fruit juice center-filled chewing gum according to the present invention may be manufactured according to methods known in the art. For example, the apparatus and method disclosed in U.S. Pat. Nos. 3,806,290 and 3,857,963 may be utilized, the disclosures of which are hereby incorporated by reference. Generally, the gum base is added to a gum kettle in molten form, other ingredients such as the sweeteners, softeners, and flavoring agents are then added to the gum kettle, and mixed until a homogeneous mass is produced. The mixture is then fed into a gum extruder and extruded through an orifice as a hollow-centered rope of chewing gum. The liquid center-fill, which is formed by mixing all of the ingredients in a mixing kettle until a homogeneous mixture is obtained, is then fed, under pressure, through an inner conduit to the hollow-center of the rope downstream of the orifice and the center-filled rope of chewing gum is passed into a sizing unit where rollers decrease the cross sectional dimension of the rope gum and form individual gum units. The finished chewing gum generally contains from about 10% to about 20% by weight of the liquid center-fill and from about 90% to about 80% by weight of the outer chewing gum shell based on the total weight of the finished chewing gum product.

The present invention will now be illustrated by the following non-limiting examples.

EXAMPLE 1

A fruit juice center-filled chewing gum was prepared by the above-described method with the following ingredients:

| INGREDIENTS | PERCENT BY WEIGHT |
| --- | --- |
| CHEWING GUM SHELL AT 85% BY WEIGHT OF FINISHED PRODUCT | |
| Gum Base | 22% |
| High Fructose Corn Syrup | 5% |
| Sucrose | 68.72% |
| USP Glycerin | 1% |
| Orange Flavor | 1.5% |
| Citric Acid | 1.7% |
| Acesulfame-K | 800 ppm |
| LIQUID CENTER-FILL AT 15% BY WEIGHT OF FINISHED PRODUCT | |
| Corn Syrup | 39.25% |
| High Fructose Corn Syrup | 39.25% |
| Sucrose | 3% |
| Water | 3% |
| Orange Juice Concentrate | 12% |
| Citric Acid/Sodium Citrate | 1.5% |
| Orange Flavor | 2% |

COMPARATIVE EXAMPLE 1

A fruit juice center-filled chewing gum was prepared in the same manner as in Example 1 except that the liquid center-fill did not contain citric acid/sodium citrate.

EXAMPLE 2

A fruit juice center-filled chewing gum with a sugarless shell was prepared by the above-described method with the following ingredients:

| INGREDIENTS | PERCENT BY WEIGHT |
|---|---|
| CHEWING GUM SHELL AT 85% BY WEIGHT OF FINISHED PRODUCT | |
| Gum Base | 22% |
| Sorbitol | 59.55% |
| USP Glycerin | 15% |
| Orange Flavor | 1.5% |
| Citric Acid | 1.7% |
| Acesulfame-K | 2500 ppm |
| LIQUID CENTER-FILL AT 15% BY WEIGHT OF FINISHED PRODUCT | |
| Carboxymethyl Cellulose Gum | 1% |
| Sorbitol Solution (30% water) | 42% |
| USP Glycerin | 41.5% |
| Orange Juice Concentrate | 12% |
| Citric Acid/Sodium Citrate | 1.5% |
| Orange Flavor | 2% |

COMPARATIVE EXAMPLE 2

A fruit juice center-filled chewing gum was prepared in the same manner as in Example 2 except that the liquid center-fill did not contain citric acid/sodium citrate.

The fruit juice center-filled chewing gums made from Examples 1 and 2 and Comparative Examples 1 and 2 were stored for 6 weeks at 37° C. accelerated conditions and were then evaluated by a panel of 10 organoleptic experts. The results are shown in Table 1.

TABLE 1

| ATTRIBUTES | EXAMPLE 1 | COMPARATIVE EXAMPLE 1 | EXAMPLE 2 | COMPARATIVE EXAMPLE 2 |
|---|---|---|---|---|
| Appearance Liquid | 3 | 2 | 3 | 2 |
| Center Squirt | 3 | 2 | 3 | 2 |

Based on a Hedonic Liking Scale of:
0 = Unacceptable 1 = Barely Acceptable 2 Fair 3 = Excellent While the present invention has been described with respect to what is presently considered to be the preferred embodiments, it is to be understood that the invention is not limited to the disclosed embodiments. The present invention is intended to cover various modifications and equivalent formulations included within the spirit and scope of the appended claims.

What is claimed is:

1. A center-filled chewing gum comprising an outer chewing gum shell enclosing a cavity and a liquid center-fill within said cavity, wherein said liquid center-fill comprises a fruit juice concentrate and an acid/buffer system wherein said acid/buffer system is a food acceptable acid and its buffer and is present in an amount sufficient to maintain the pH of said center-fill at from about 2 to about 4.

2. The center-filled chewing gum according to claim 1, wherein said fruit juice concentrate is selected from the group consisting of orange juice concentrate, cherry juice concentrate, grape juice concentrate, strawberry juice concentrate, lime juice concentrate, apple juice concentrate, pineapple juice concentrate, peach juice concentrate, raspberry juice concentrate, lemon juice concentrate, apricot juice concentrate, banana juice concentrate, tangerine juice concentrate, blueberry juice concentrate, mango juice concentrate, papaya juice concentrate, grapefruit juice concentrate, pear juice concentrate, and mixtures thereof.

3. The center-filled chewing gum according to claim 2, wherein said fruit juice concentrate is selected form the group consisting of orange juice concentrate, apple juice concentrate, grape juice concentrate, and pear juice concentrate.

4. The center-filled chewing gum according to claim 3, wherein said fruit juice concentrate is an orange juice concentrate.

5. The center-filled chewing gum according to claim 3 wherein said fruit juice concentrate is an apple juice concentrate.

6. The center-filled chewing gum according to claim 3 wherein said fuit juice concentrate is a grape juice concentrate.

7. The center-filled chewing gum according to claim 1, wherein said acid/buffer system is selected from the group consisting of citric acid/sodium citrate, lactic acid/sodium lactate, tartaric acid/potassium hydrogen tartrate, and malic acid/sodium lactate.

8. The center-filled chewing gum according to claim 7, wherein said acid/buffer system is citric acid/sodium citrate.

9. The center-filled chewing gum according to claim 1, wherein said center-fill further comprises at least one sweetener.

10. The center-filled chewing gum according to claim 9, wherein said sweetener is a saccharide sweetener.

11. The center-filled chewing gum according to claim 9, wherein said sweetener is a sugar alcohol.

12. The center-filled chewing gum according to claim 9, wherein said sweetener is an intense sweetener.

13. The center-filled chewing gum according to claim 1, wherein said center-fill further comprises a flavoring agent.

14. The center-filled chewing gum according to claim 1, wherein said center-fill further comprises a softener.

15. The center-filled chewing gum according to claim 1, wherein said center-fill comprises from about 5% to about 40% by weight of said fruit juice concentrate and from about 0.1% to about 3% by weight of said acid/buffer system, based on the total weight of said liquid center-fill.

16. The center-filled chewing gum according to claim 15, wherein said center-fill comprises from about 10% to about 20% by weight of said fruit juice concentrate and from about 0.5% to about 2% by weight of said acid/buffer system.

17. The center-filled chewing gum according to claim 1, comprising from about 10 to about 20% by weight of said liquid center-fill and from about 90 to about 80% by weight of said outer chewing gum shell based on the total weight of said chewing gum.

\* \* \* \* \*